May 27, 1930. W. J. PEARMAIN 1,760,605
CLUTCH
Filed Jan. 3, 1928 2 Sheets-Sheet 2

Inventor:
William J. Pearmain
By Rector Hibben Davis Macauley
Attys.

Patented May 27, 1930

1,760,605

UNITED STATES PATENT OFFICE

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN

CLUTCH

Application filed January 3, 1928. Serial No. 244,083.

My invention relates to that form of clutch for connecting and disconnecting two coaxial rotary elements in which a friction disk, attached to one of the elements is engaged on opposite sides thereof by clamping disks keyed to the other element. The present improvement relates more particularly to improvements in the means for adjusting the clutch, primarily, and to take up wear, etc. The nature and scope of the invention will appear from the following specification and claims, it being understood that the specific description is for the purpose of exemplification only, and that the scope of the invention is defined in the claims.

Figure 1:
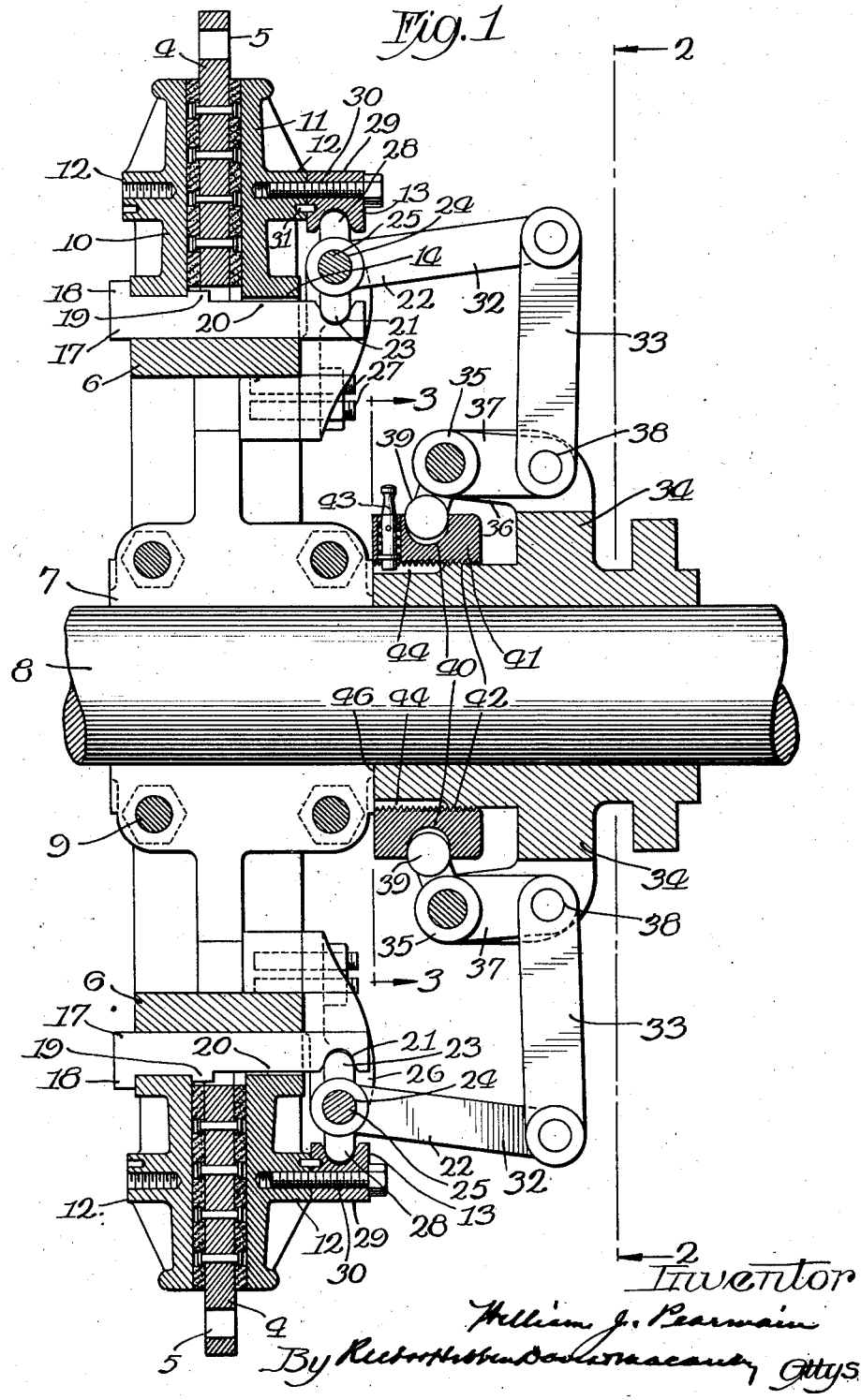

In the drawings accompanying and forming a part of this specification, Fig. 1 is an axial section through a preferred form of clutch embodying my invention.

Figure 2:
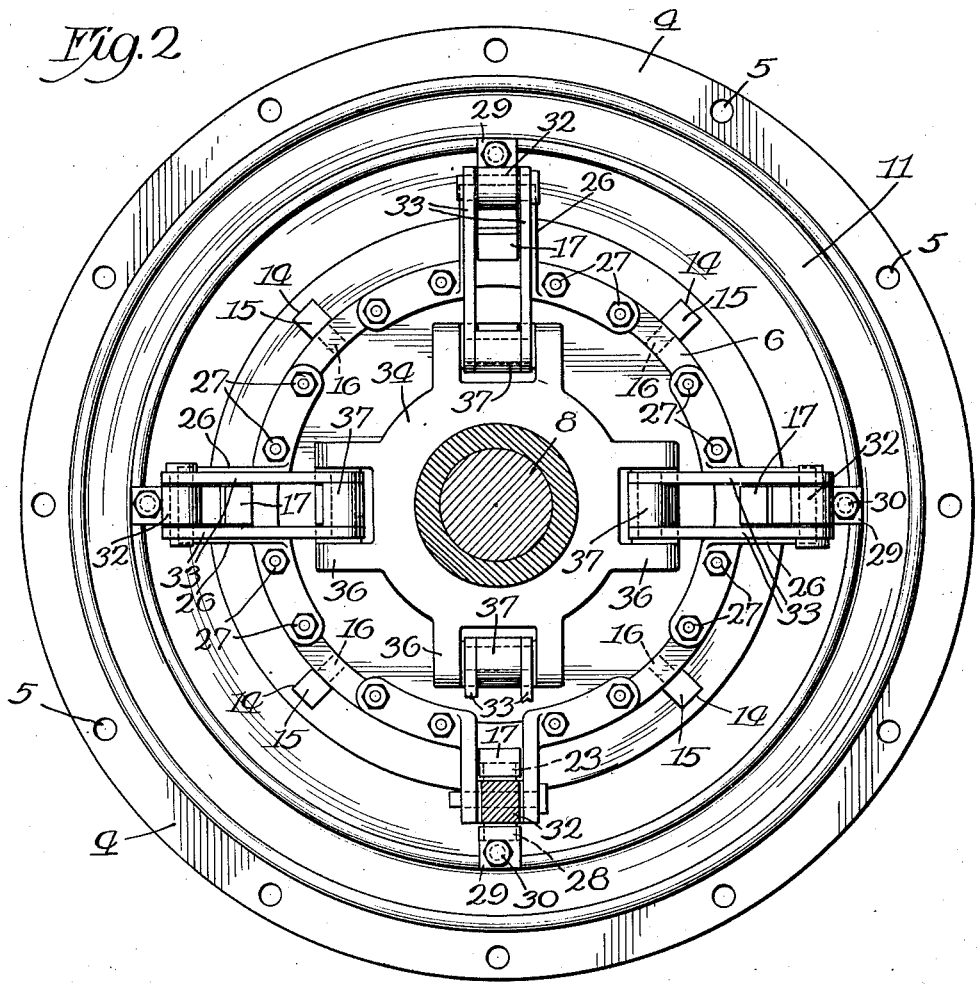
Figure 3:
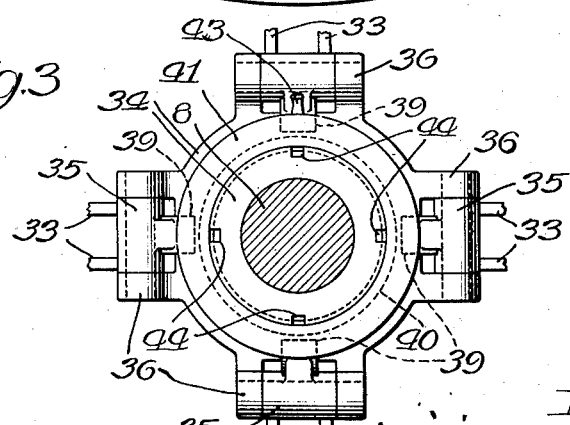

Fig. 2 a transverse section through the clutch and a shaft to which it is applied on the line 2—2 of Fig. 1, and Fig. 3 a similar section through the line 3—3 of Fig. 1.

Each part is identified by the same reference character in the several views.

In the specific form of the invention, the friction disk 4 is shown as provided with bolt holes 5, for attachment to a fly wheel or other rotary part of large diameter, and a hub 6 having a split collar 7, is shown as fixed upon a shaft 8 which will be referred to as the driven member. Bolts 9 shown in section, suitably headed and provided with nuts, clamp the split collar upon the shaft.

The clamping disks 10, 11 fit upon the cylindrical periphery of the hub and are keyed thereto so as to have a sufficient axial movement thereon to permit their engaging and being disengaged from the intermediate friction disk, but to rotate with the hub. It is convenient that these clamping disks be identical and interchangeable, and with this in view, each disk is formed with seats 12 for the reception of pillow blocks 29, though only one of said clamping disks is furnished with said blocks, as will presently appear. The inner periphery of each disk is formed with a plurality of spaced transverse rectangular ways 14, there being eight in each clamping disk in the specific structure shown, alternate ways receiving similar keys 15, which are secured to the periphery of the hub 6 by dowels 16. Alternate ways 14 receive the actuating slides or keys 17 for actuating the clamping disk 10. These slides fit snugly in the ways 14 of disk 10 and are formed with outwardly extending ears 18, 19, which embrace the edge of the disk so that the slides may move the disk without lost motion. The friction disk is of such interior diameter as to be out of engagement with the slides. The slides are of slightly reduced cross section at 20 so that they may slide freely through the ways 14 of the clamping disk 11. Beyond the latter, the slides are formed with partially cylindrical notches or seats 21 to receive the ends of the lever arms to be presently described.

For each slide 17 there is a lever 22, having a short arm 23, with a rounded end which engages in a seat 21 of said slide. The levers 22 are journaled at 24 on pins 25 extending between the lugs 26, of which there is a pair for each lever, bolted at 27 to the edge of the hub. Each lever is formed with a second short arm 28, likewise rounded at its end and engaging a seat in a pillow block 29 bolted to the clamping disk 11 at 30. The pillow block is prevented from turning on the bolt by a dowel pin 31. Each lever is also formed with a longer arm 32 for operating it. The arms 32 are connected by pairs of links 33 to adjustable devices on a sliding sleeve 34, which is adapted and intended to slide upon the driven shaft 8 for operating the levers to close and open the clutch. The adjustable devices above mentioned are bell crank levers 35, which are pivoted between the members of pairs of lugs 36, formed on the collar 34. The links 33 are pivoted to the longer arms 37 of said levers and on opposite sides of said arms at 38. The shorter arms of said levers are formed with approximately cylindrical cross heads 39, which are received in an annular groove 40 in a collar 41, which is threaded and adjustable on the inner end of sleeve 34 at 42. Manifestly by rotating the collar it may be adjusted and thereby vary the angular position of the levers 35. A spring pressed pin 43 extending through the collar locks in a longitudinal groove or notch 44, of which there is a suitable number spaced above the end of the sleeve so that the collar may be locked in adjusted position, and adjusted by merely pulling out the pin and rotating the collar.

It will be obvious that the adjustment of the collar adjusts the inner pivotal points of the links with relation to the axis of the clutch and thereby it adjusts the engagement of the clamping disks with the friction disk. By moving the sleeve 34 away from the clutch, the longer arms 32 of the operating levers are drawn inward and the levers so turned as to separate the clamping disks from the friction disk, and the reverse movement of the sleeve throws the clamping disks into engagement with the friction disk. The clutch is so designed that when the inner end 46 of sleeve 34 abuts against the hub, the links 33 are barely past the dead center and the clamping disks releasably locked against the friction disk.

I claim:

1. In a clutch of the form described comprising a friction disk, clamping disks on opposite sides thereof and movable into and out of engagement therewith, and a hub adapted to be secured to a shaft to which hub said clamping disks are keyed for rotary movement therewith, actuating levers, fulcrumed on the hub and pivotally engaging one of said clamping disks, slides engaged by the respective levers and engaged with the other of the clamping disks for moving the latter into and out of engagement with the friction disk, a sleeve adapted to slide on the shaft to which the hub is secured, levers pivoted on said sleeve, links connecting the first mentioned with the last mentioned levers and means for adjusting the last mentioned levers.

2. In a clutch of the form described comprising a friction disk, clamping disks on opposite sides thereof and movable into and out of engagement therewith, and a hub adapted to be secured to a shaft to which hub said clamping disks are keyed for rotary movement therewith, actuating levers, connections between the same and the clamping disks for moving the latter into and out of engagement with the friction disk, a sleeve adapted to slide on the shaft to which the hub is secured, bell crank levers pivoted on said sleeve, links connecting the last mentioned with the first mentioned levers, a collar longitudinally adjustable on said sleeve, means for holding the collar in adjusted position, each lever on the sleeve having an arm engaging the adjustable collar.

3. In a clutch of the form described comprising a friction disk, clamping disks on opposite sides thereof and movable into and out of engagement therewith, and a hub adapted to be secured to a shaft to which hub said clamping disks are keyed for rotary movement therewith, actuating levers, connections between the same and the clamping disks for moving the latter into and out of engagement with the friction disk, a sleeve adapted to slide on the shaft to which the hub is secured, bell crank levers pivoted on said sleeve, links connecting the last mentioned with the first mentioned levers, a collar longitudinally adjustable on said sleeve, means for holding the collar in adjusted position, each lever on the sleeve having an arm with a rounded end extending into an annular groove on said collar.

4. In a clutch of the character described comprising a friction disk, clamping disks on opposite sides thereof, movable into and out of engagement therewith, a hub adapted to be secured to a shaft to which hub said clamping disks are keyed for rotary movement therewith, actuating slides connected to one of the clamping disks and extending through the friction disk, and the second clamping disk, levers each engaging one of said slides and a seat on the second said disk, a sliding collar adapted to slide upon said shaft, adjustable devices on said collar, and links connecting the levers to said adjustable devices.

In testimony whereof, I have subscribed my name.

WILLIAM J. PEARMAIN.